(12) United States Patent
Wild et al.

(10) Patent No.: US 6,247,462 B1
(45) Date of Patent: Jun. 19, 2001

(54) SYSTEM FOR OPERATING AN INTERNAL COMBUSTION ENGINE, ESPECIALLY FOR A MOTOR VEHICLE

(75) Inventors: Ernst Wild, Oberriexingen; Roland Herynek, Oetisheim, both of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/472,777

(22) Filed: Dec. 27, 1999

(30) Foreign Application Priority Data

Jan. 12, 1999 (DE) .............................................. 199 00 729

(51) Int. Cl.[7] .................................................. F02M 25/07
(52) U.S. Cl. ...................................... 123/568.21; 701/108
(58) Field of Search ........................ 123/568.11, 568.12, 123/568.21, 568.23, 568.24, 568.25, 568.26, 568.27, 568.28; 701/108

(56) References Cited

U.S. PATENT DOCUMENTS

| | | | |
|---|---|---|---|
| 4,279,235 | * 7/1981 | Flaig et al. ...................... | 123/568.21 |
| 4,548,185 | * 10/1985 | Pozniak ............................... | 701/108 |
| 4,999,781 | * 3/1991 | Holl et al. ............................ | 701/108 |
| 5,303,168 | * 4/1994 | Cullen et al. ........................ | 701/108 |
| 5,357,936 | * 10/1994 | Hitomi et al. ................... | 123/568.12 |
| 5,359,519 | * 10/1994 | Jehanno ............................... | 701/108 |
| 5,845,627 | * 12/1998 | Olin et al. ........................... | 701/108 |
| 5,921,223 | * 7/1999 | Fukuma .............................. | 701/108 |
| 5,934,249 | * 8/1999 | Nanba et al. .................... | 123/568.21 |
| 6,109,249 | * 8/2000 | Wild et al. ....................... | 123/568.21 |

* cited by examiner

*Primary Examiner*—Willis R. Wolfe
(74) *Attorney, Agent, or Firm*—Michael J. Striker

(57) ABSTRACT

An internal combustion engine (1), especially for a motor vehicle is described, which is provided with a regulating valve (8) arranged in an intake pipe (6), through which air is fed to a combustion chamber (4). Furthermore the internal combustion engine (1) is provided with an exhaust gas feedback valve (15), through which exhaust gas is fed to an intake pipe (6). The internal combustion engine has a control unit (17) which determines the mass flow (msdk) through the regulating valve (8) and the mass flow (msagr) through the exhaust gas feedback valve (15). The determined mass flow (msagr) through the exhaust gas feedback valve (15) is divided into an inert gas portion (msagr') and an air portion (msl) according to the air/fuel ratio (Lambda).

5 Claims, 4 Drawing Sheets

SYSTEM FOR OPERATING AN INTERNAL COMBUSTION ENGINE, ESPECIALLY FOR A MOTOR VEHICLE

BACKGROUND OF THE INVENTION

1. Field of the Invention

The present invention relates to a method of operating an internal combustion engine, especially for or in a motor vehicle, in which air is fed to a combustion chamber via a regulating valve arranged in an intake pipe and the mass flow through the regulating valve is determined and in which exhaust gas is feedback into the intake pipe through an exhaust feedback valve arranged in an exhaust gas feedback line, and the mass flow through this latter valve is determined. Furthermore the present invention relates to an internal combustion engine, especially for a motor vehicle, comprising a regulating valve arranged in an intake pipe, through which air is supplied to a combustion chamber, an exhaust feedback valve arranged in an exhaust feedback line, by means of which exhaust gas is fed into the intake pipe and a control unit, with which the mass flow through the regulating valve and the mass flow through the exhaust feedback valve in the exhaust gas feedback line are determined and adjusted.

2. Prior Art

The requirements for modern internal combustion engines in regard to reduction of fuel consumption and the pollutants and/or exhaust gases emitted are ever more stringent and/or higher. For these reasons the metering of fuel into the combustion chamber of the internal combustion engine must be further improved, particularly the metering of fuel mass must be made more accurate. For this purpose in the known internal combustion engine the mass flow of the air supplied to the combustion chamber through the regulating valve or flap is measured with the help of an air mass sensor, e.g. a so-called HFM sensor. The mass flow measured in this way is then used to calculate the required associated mass of fuel to be injected, which is required in order to attain the predetermined vehicle state desired by the operator of the motor vehicle, for example an acceleration of the motor vehicle.

Especially for further reduction of the exhaust pollutants in modern internal combustion engines a so-called exhaust gas feedback is provided, in which the exhaust gas output from the internal combustion chamber is fed back through a valve to the intake pipe and thus to the combustion chamber. The mass flow through this valve can be set, for example by means of a signal, with which the valve is controlled, especially a signal for setting the position of the valve. The exhaust gas feed back is then taken into consideration in the determination of the mass of fuel to be injected.

The internal combustion engine is preferably operated with an air/fuel ratio, Lambda, equal to one. However operating states always occur in which the air/fuel ratio, Lambda, deviates from one.

SUMMARY OF THE INVENTION

It is an object of the present invention to provide a method of operating an internal combustion engine, in which operating states are also taken into consideration in which the ratio of air/fuel, Lambda, deviates from one.

This object, and others which will be made more apparent hereinafter, are attained in a method of operating an internal combustion engine, especially for or in a motor vehicle, in which air is fed to a combustion chamber via a regulating valve arranged in an intake pipe, the mass flow through the regulating valve is determined, exhaust gas is fed back into the intake pipe through an exhaust feedback valve arranged in an exhaust gas feedback line and the mass flow through this latter valve is determined.

According to the invention this object is attained in a method of operating an internal combustion engine of the above-described kind, in which the determined or calculated mass flow through the exhaust feedback valve is divided into an inert gas portion and an air portion according to the air/fuel ratio, Lambda.

The exhaust gas feedback flow into the intake pipe from the exhaust pipe is not treated or handled like a flow with an air/fuel ratio, Lambda, equal one, also not as a pure inert gas, or an entirely non-combustible gas, but instead it is broken down into its individual components according to the actual air/fuel ratio, Lambda. These components are the inert gas portion and an air portion. The method according to the invention thus proceeds or operates with these portions during further processing.

The fact that the entire air mass in the combustion chamber is not required for complete combustion of the fuel because the air/fuel ratio, Lambda, deviates from one is taken into consideration by the division of the exhaust gas into its inert gas portion and its air portion. This fact is introduced into the method according to the invention and is considered by it.

In an advantageous preferred embodiment of the invention the determined air portion of the exhaust gas feedback flow is added to the mass flow through the regulating valve or throttle flap in the intake pipe. Because of that feature the air portion reaching the intake pipe via the exhaust feedback is considered in the process according to the invention like the air drawn into the intake pipe through the throttle valve. Because of that aspect excess oxygen in the combustion air arrives in the intake pipe by means of the exhaust gas feedback and is considered in the determination of the fuel to be injected.

In another advantageous embodiment of the invention a standard mass flow through the regulating valve is first determined from a duty factor or ratio of the feedback valve and then the current mass flow through the regulating valve is determined from this standard mass flow according to parameters for the internal combustion engine. This produces an especially simple, but in spite of that simplicity, an especially exact method of controlling the mass flow through the valve from the duty factor or ratio, with which the valve is controlled.

It is particularly significant that the method according to the invention is actually accomplished by providing a control means for a control unit of an internal combustion engine, especially a motor vehicle. A program is stored in the control means, which can be executed in a processing device, especially a microprocessor, and is suitable for various embodiments of the method according to the invention. In this case also the invention is realized by a program stored in the control means, so that it is suitable to perform the embodiments of the method which the program is adapted to perform. An electronic storage medium, for example a Read-Only-Memory, can be used as the control means.

BRIEF DESCRIPTION OF THE DRAWING

The objects, features and advantages of the invention will now be illustrated in more detail with the aid of the following description of the preferred embodiments, with reference to the accompanying figures in which.

DESCRIPTION OF THE PREFERRED EMBODIMENTS

Figure 1:
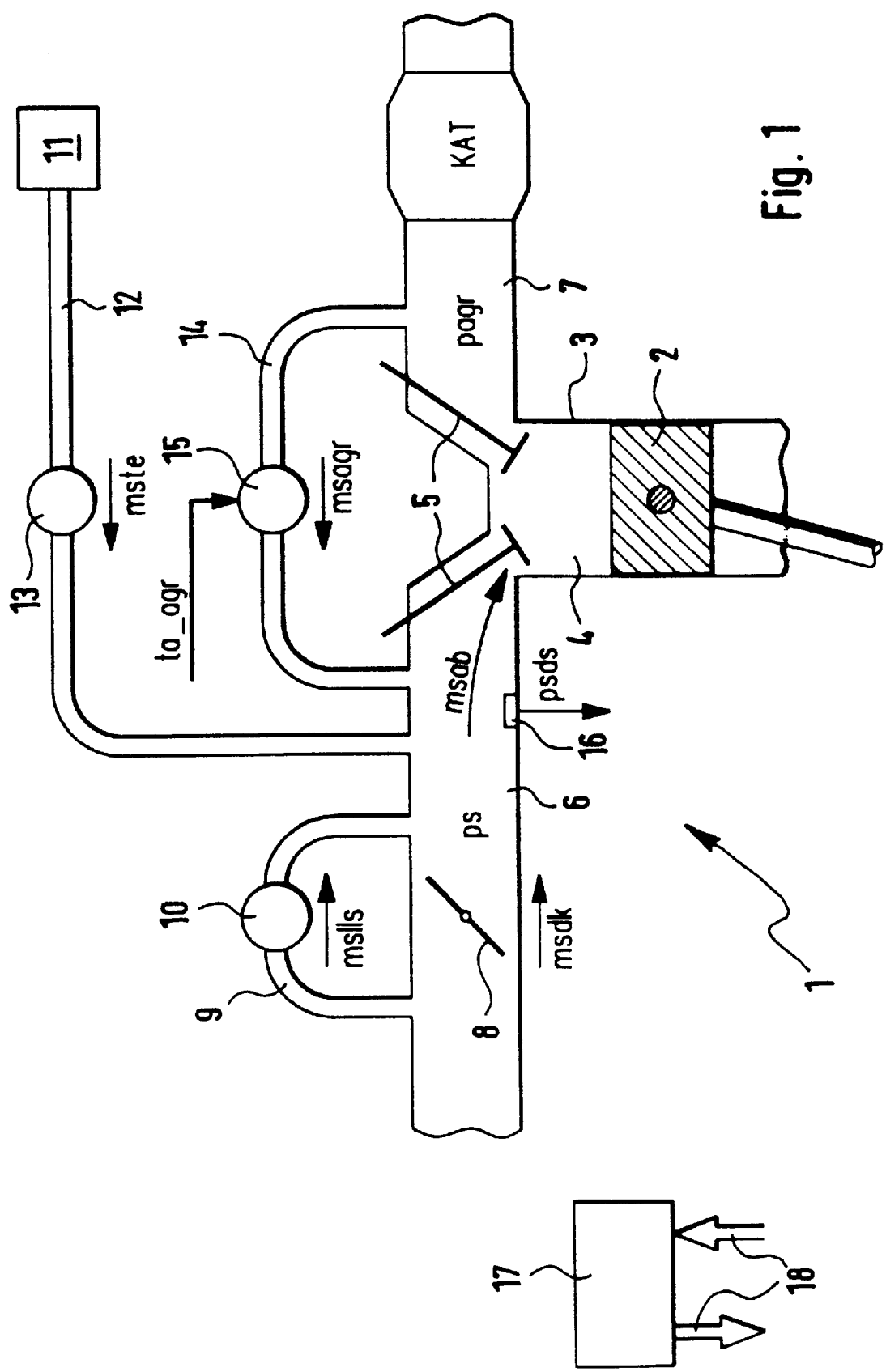
FIG. 1 is a schematic diagram of one embodiment of an internal combustion engine for a motor vehicle according to the invention.

An internal combustion engine 1 of a motor vehicle is shown in FIG. 1, in which a piston 2 is movable back and forth in a cylinder 3. The cylinder 3 is provided with a combustion chamber 4, to which an intake pipe 6 and an exhaust pipe 7 are connected by means of the cylinder valves 5. Furthermore a fuel injection valve and a spark plug are connected to the combustion chamber 4 in unshown ways.

A rotatable regulating valve or flap 8 is mounted in the intake pipe 6, which is associated with an angular sensor in an unshown way, with which the angular position of the regulating flap 8 can be measured.

An idle adjusting device is connected parallel to the regulating valve 8. This idle adjusting device comprises a bypass line 9 and a bypass valve 10 arranged in the bypass line 9. The regulating valve 8 is by-passed with the bypass line 9 and the flow through the bypass line 9 can be controlled with the bypass valve 10.

A tank vent device is connected to the intake pipe 6 between the regulating valve 8 and the internal combustion chamber 4. The tank vent device has an activated charcoal filter 11, which is connected via a vent line 12 with the intake pipe 6. A tank vent valve 13 is connected in the vent line 12. Regenerated gas from the activated charcoal filter 11 can be supplied to the combustion chamber by means of the vent line 12. The input of regenerated gas to the intake pipe 6 can be controlled with the vent line valve 13.

An exhaust gas feedback line 14 is connected to the intake pipe 6 for feedback of exhaust gas from the exhaust pipe 7. An exhaust gas feedback valve 15 is provided in the exhaust gas feedback line 15 for controlling the feedback of exhaust gas to the intake pipe 6.

A pressure sensor 16 is arranged in the vicinity of the intake pipe 6, which measures the pressure ps in the intake pipe 6. Since the actual pressure is measured in this case, the pressure measured by the pressure sensor 16 is designated with psds. The pressure sensor need not necessarily be present.

An unshown charger device, through which air fed to the intake pipe 6 is conducted, can be connected to the intake pipe 6 upstream of the regulating valve 8 and the idle adjusting device. Furthermore an unshown air mass sensor, especially a so-called HFM sensor, can be mounted upstream of the charger, through which the air is conducted. A catalyzing device KAT is also preferably provided in the exhaust pipe 7 downstream of the location where the exhaust gas feedback line 15 is connected.

The air mass flow through the regulating valve 8 is indicated as mass flow msdk, the exhaust gas flow through the valve 15 is indicated as mass flow msagr and the air/exhaust gas mixture mass flow fed to the combustion chamber 4 is designated as mass flow msab.

Furthermore the internal combustion engine 1 is provided with a control unit 17, which is connected by means of suitable electrical connections 18 with sensors of the internal combustion engine 1, for example with the angle sensor associated with the regulating flap or regulating valve 8 and/or the pressure sensor 16 as well as with actuators for the internal combustion engine 1, for example with the valves 10, 13 and 15.

Figure 2:
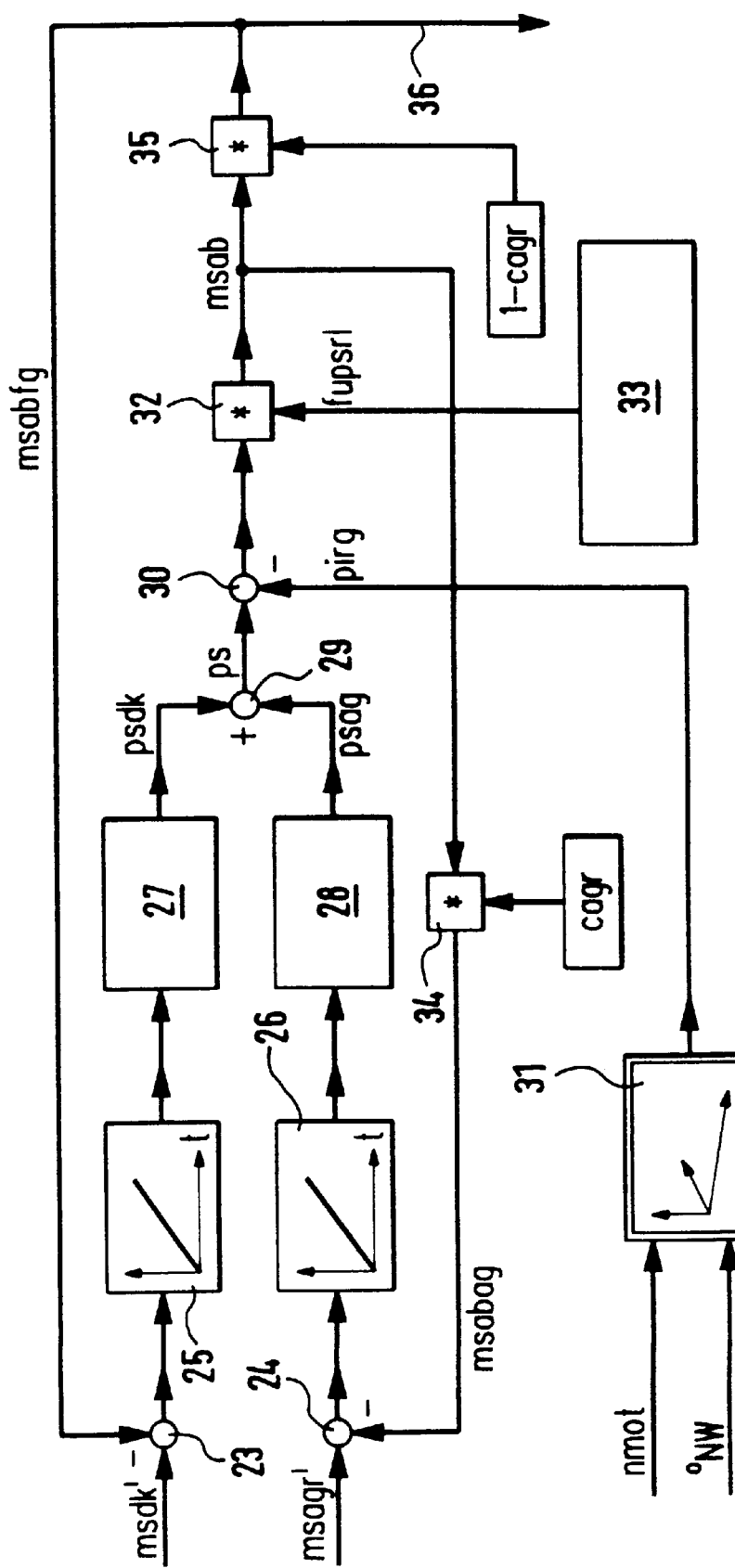
FIG. 2 is a schematic flow chart of a part of an embodiment of a method of operating the internal combustion engine according to FIG. 1.
Figure 3:
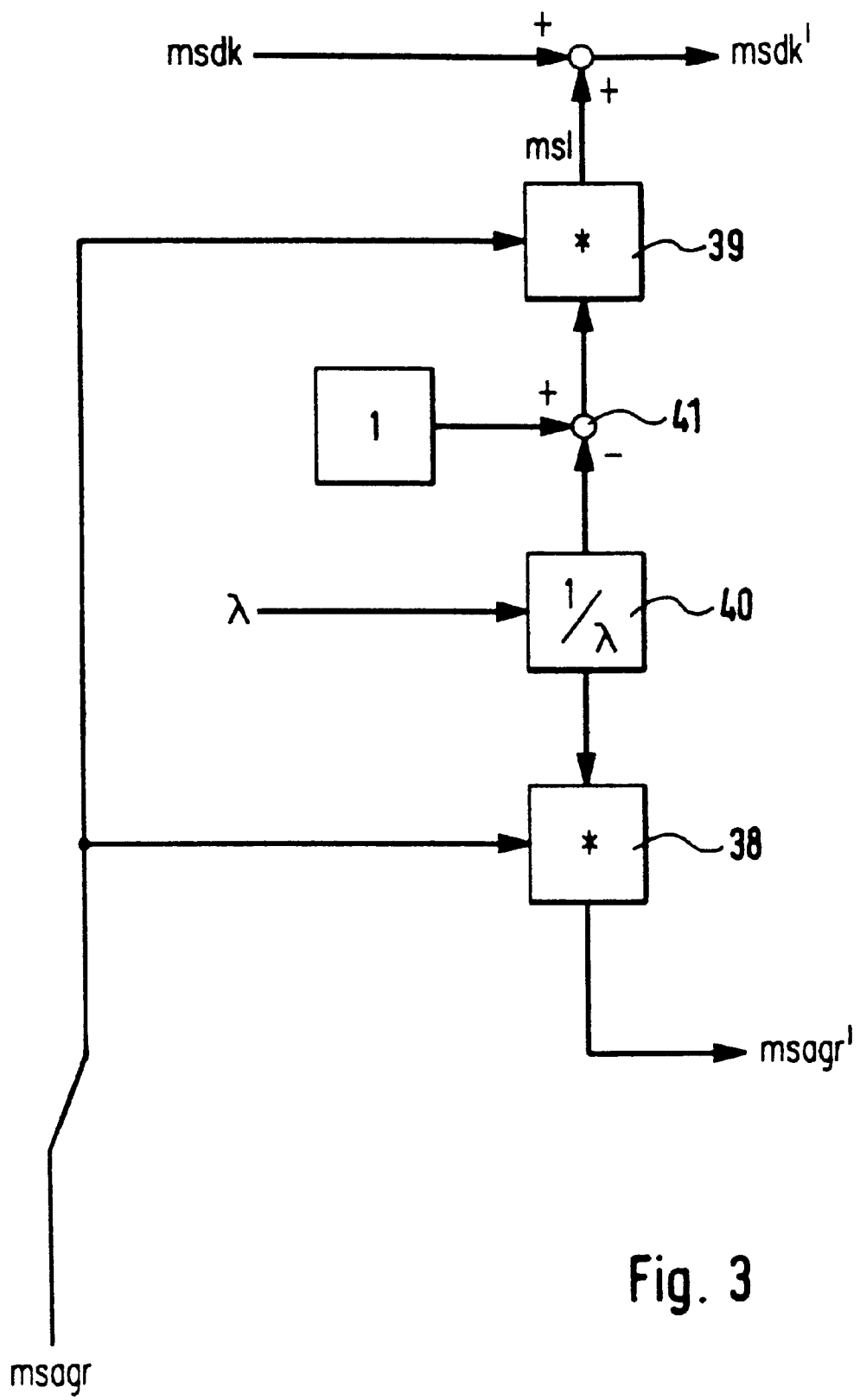
FIG. 3 is a schematic flow chart of another part of the method of operating the internal combustion engine according to FIG. 2 showing the division of the exhaust gas into an inert gas portion and an air portion.

In FIGS. 2 and 3 a method of operating the internal combustion engine 1 is shown which is performed by the control unit 17. The idle adjusting device with the mass flow mslls and the tank vent device with the mass flow mste, must however not be present or active. In the method according to FIGS. 2 and 3 these mass flows are not considered, however currently they can be considered by suitable, especially additive combinations. Furthermore in the embodiment of the method of the invention according to FIGS. 2 and 3 no charger is considered to be present. However this charger can also be currently considered currently when it is present.

The method shown in FIGS. 2 and 3 starts with the mass flow msdk through the regulating valve 8 and the mass flow msagr through the exhaust gas feedback valve 15. The mass flow msdk is calculated from the angular position of the regulating flap or regulating valve 8, since a normal mass flow is first determined which then is adjusted to the actual condition in the internal combustion engine 1 by temperature and/or pressure-dependent factors.

Figure 4:
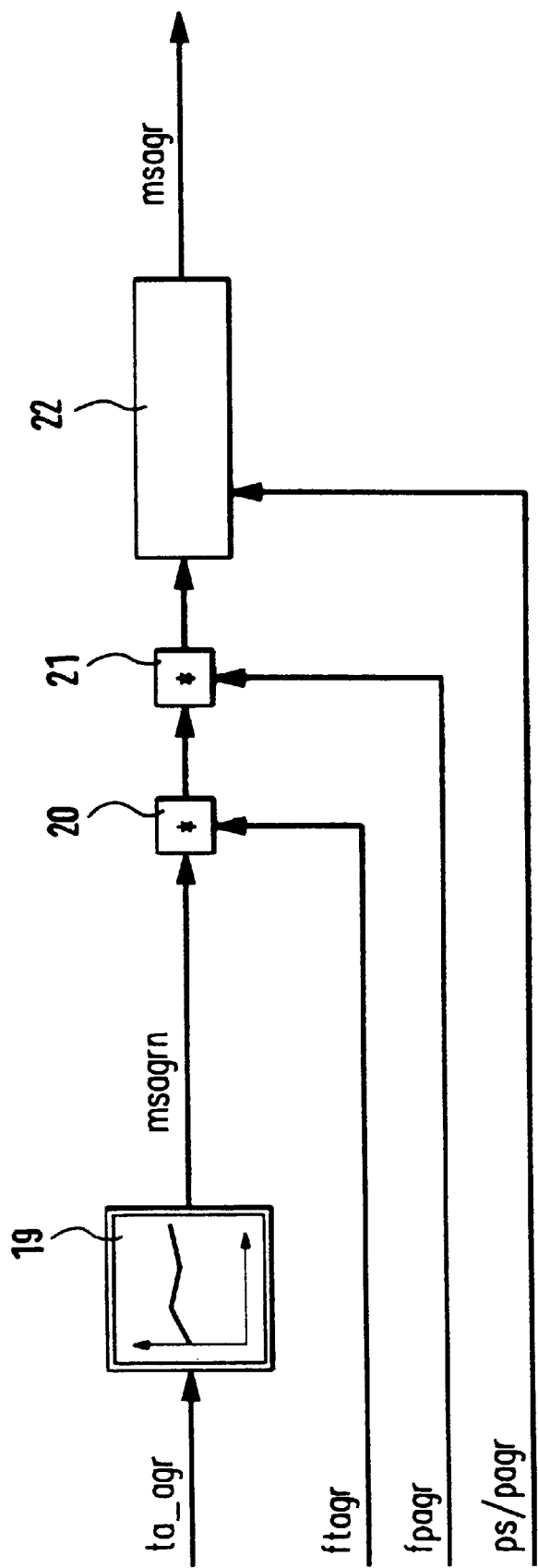
FIG. 4 is a schematic flow chart of an additional set of process steps for use in the method shown in FIGS. 2 and 3.

The mass flow msagr through the valve 15 in the exhaust gas feedback line 14 is determined according to the process in FIG. 4. Also this process is performed in the control unit 17.

The exhaust gas feedback valve 15 is controlled according to the duty ratio ta_agr. This duty ratio ta_agr is fed to a characteristic curve device 19, which corresponds to the valve 15 and simulates it under normal conditions. The characteristic curve device 19 operates according to or simulates the above-described normal or standard conditions. The output signal of the characteristic curve device 19 produces a standard mass flow msagrn through the valve 15.

After that the standard mass flow msagrn is adjusted to the actual conditions in the internal combustion engine 1. For this purpose the standard mass flow msagrn is multiplied by a factor fpagr that represents the temperature conditions of the exhaust gas in the exhaust gas feedback valve 15 by means of a multiplier device 20. Similarly the standard mass flow msagrn is then also multiplied by a factor fpagr which represents the pressure conditions for the exhaust gas in the valve 15 by means of another multiplier device 21. Both factors ftagr and fpagr are normalized.

After that the output signal of the multiplier device 21 is combined together with the ratio of the pressure ps in the intake pipe 6 and the pressure pagr in the exhaust gas pipe 7 in the characteristic curve device 22. In this manner the outflow conditions of valve 15 are taken into account, also the flow speed of the exhaust gas through the valve 15. The output signal of the characteristic curve device 22 is the mass flow msagr through the exhaust gas feedback valve 15 provided in the exhaust gas feedback line 14 under the current operating conditions.

The mass flow msagr, also the external exhaust gas feedback, is fed to two multipliers 38 and 39 according to FIG. 3.

A so-called Lambda sensor can be provided near the catalyzer of the internal combustion engine 1, with which the air/fuel ratio, also the value Lambda($\lambda$) can be measured.

This Lambda can also be determined by means of another sensor, if necessary, and/or can be calculated by the control unit 17.

This air/fuel ratio λ is supplied to block 40 in FIG. 3. Its reciprocal value is fed on the one hand to the multiplier 38 and, on the other hand, to the combining device 41. The combining device 41 also receives the value "1" as an additional input signal. The reciprocal value mentioned above is subtracted from the value "1" in the combining device 41. The output signal of the combining device 41 is fed to the multiplier device 39.

In FIG. 3 the above-mentioned total mass flow msagr is divided into an inert gas portion and an air portion according to the air/fuel ratio λ in the steps shown in FIG. 3. The inert gas portion is available at the output of the multiplier device 38 as mass flow msagr', while the air portion is present at the output of the multiplier device 39 as mass flow msl.

If for example the air/fuel ratio λ equals 1, a complete combustion occurs, so that only inert gas and no air are contained in the exhaust gas supplied by means of the external exhaust gas feedback. This is taken into consideration in the method shown in FIG. 3 since the output signal of combining device 41 would then be zero. Thus the mass flow msl is similarly null. The multiplier device 38 gives the total mass flow msagr as the mass flow msagr'.

If in contrast the air/fuel ratio λ is not equal to 1, a so-called lean combustion occurs, so that an excess of oxygen is present and the exhaust gas supplied by the internal and external exhaust gas feedback contains an air portion as well as an inert gas portion. This is taken into consideration in the method shown in FIG. 3 since in this case the output signal of the multiplier device 39 is not equal to zero. Thus the air portion is considered as mass flow msl. The total mass flow msagr of the external exhaust gas feed back is multiplied by a factor which is smaller than one in the multiplier device 38. Thus a mass flow msagr' which represents the inert gas portion in the exhaust gas results.

The latter-named mass flow msagr' is further processed in subsequent method steps shown in FIG. 2. It represents—as already mentioned—the inert gas portion of the external exhaust gas feed. Thus the following explanations in FIG. 2 always relate to this inert gas portion independently of the actual air/fuel ratio λ in the exhaust gas range. The air portion of this exhaust gas is taken into account by means of the mass flow msl.

The mass flow msl is fed to a combining device 42 according to FIG. 3, where it is added with the mass flow msdk through the regulating valve 8. The output signal of the combining device 42 represents thus the entire air portion, which is taken into the combustion chamber 4 of the internal combustion engine 1 through the regulating valve 8 and by means of the internal and external exhaust feedback. This total air flow is given as the mass flow msdk' and is used further in the steps shown in FIG. 2.

A signal msabfg is subtracted from the mass flow msdk' through the regulating valve 8 and the external exhaust gas feedback. Similarly the mass flow msagr' of the internal and external exhaust gas feedback is subtractively combined with a signal msabag, i.e. the latter signal is substracted from the mass flow msagr'. These signals msabfg and msabag have yet to be described in detail.

The output signals of the combining devices 23 and 24 are input to the to integrators 25 and 26 respectively. The feed behavior of the intake pipe 6 is simulated by means of these integrators 25 and 26. The output signals of these integrators 25 and 26 are fed to respective blocks 27 and 28, in which particularly temperature-dependent recalculations of the respective mass flows occur at an associated pressure. The output signal of the block 27 is a partial pressure psdk in the intake pipe 6, which is due to the air. The output signal of the block 28 is a partial pressure psag in the intake pipe 6, which is due to the inert gas.

The partial pressures psdk and psag are added in the adder 29 and the pressure ps in the intake pipe 6 results. The pressure ps represents a simulation of the actual pressure present in the intake pipe 6. The pressure value ps is not a measured pressure in contrast to the above-mentioned measure pressure psds.

The calculated or determined pressure ps is compared with a pressure pirg in a comparing device 30. This pressure pirg corresponds to that pressure in the combustion chamber 4 that results when a certain residual amount of gases are not forced out of the combustion chamber 4 after a combustion event. The pressure pirg is thus a residual gas pressure in the combustion chamber 4.

The pressure pirg is produced by a performance graph device 31 according to the rotation speed nmot of the internal combustion engine and the size °NW of the angular range of the camshaft, during which the cylinder inlet valve 5 and the cylinder outlet valve 5 of the internal combustion engine are simultaneously open. If necessary, the pressure pirg also depends on the altitude at which the internal combustion engine is located.

The difference value produced by the comparing device 30 is supplied to a multiplier device 32 in which the difference is multiplied by a factor fupsrl. The factor fupsrl converts the pressure ps into a mass flow msab supplied to the combustion chamber 4.

The factor fupsrul is, among other things, produced in the performance graph device 33 according to according to the rotation speed nmot of the internal combustion engine and the size °NW of the angular range of the camshaft. Furthermore it is possible to take into consideration the temperature of the gas in the combustion chamber 4 of the internal combustion engine 1, which for example can be determined from the temperature of the cooling water of the internal combustion engine by means of a model calculation.

The output signal of the multiplier device 32 is the mass flow msab supplied to the combustion chamber, which is also shown in FIG. 1.

A factor cagr is determined by the control unit 17 from the partial pressure psdk and the partial pressure psag. The factor cagr corresponds to the fraction or portion of the exhaust gas fed back to combustion chamber 4 in the mass flow msab. The factor cagr also represents the exhaust gas feedback rate dependent on the position of the exhaust gas feedback valve 15.

The mass flow flowing to and from the intake pipe 6 adjusts itself according to the following: The mass flow msdk' and the mass flow msagr' flow into the intake pipe 6, while the mass flow msab flows out of the intake pipe 6 into the combustion chamber 4 of the internal combustion engine 1. The outgoing mass flow msab results from the inert gas portion msabag and the fresh gas portion msabfg.

The inert gas portion msabag is the inert gas portion of the total mass flow msab supplied to the intake pipe 6 by means of the exhaust gas feedback valve 15. That inert gas portion corresponds to the factor cagr. The inert gas portion msabag is equal to msab×cagr. This multiplication is accomplished by means of a multiplier device 34.

The fresh gas portion msabfg corresponds to the portion still remaining of the total mass flow msab, also that portion of the total mass flow msab, which is supplied to the intake pipe 6 by means of the regulator valve 8. This portion corresponds to the factor (1−cagr). The fresh gas portion msabfg is equal to msab×(1−cagr). This product is obtained from the multiplier device 35.

As has already been explained, the fresh gas portion msabf and the inert gas portion msabag are subtracted from the respective mass flows msdk' and msagr' in the combining devices 23 and 24. Because of this operation the mass flows msabag and msabfg flowing from the intake pipe 6 are always derived from the input mass flows msdk' and msagr', so that the integrators 25 and 26 provided downstream of the combining devices 23 and 24 always represent the actual values of the temporarily stored mass flows in the intake pipe 6.

If the valve 15 for example is again opened by an adjustment of the duty factor ta_agr, the factor cagr is increased. That means that more exhaust gas arrives in the intake pipe 6 over the exhaust gas feedback line 14. Because of that fact however the inert gas portion msabag in the mass flow supplied to the combustion chamber is greater. This result because msabag=cagr×msab. Simultaneously the fresh gas portion msabfg is less according to msabfg=(1−cagr)×msab. A previous equilibrium existing at the combining and 24 is thus disturbed. To reach a new equilibrium e.g. the mass flow msdk can be increased, so that the throttle valve 8 can be opened further. This can be achieved with the help of the fresh gas portion msabfg, since the output signal 36 is further processed into a control signal for the regulator valve 8.

The disclosure in German Patent Application 199 00 729.2 of Jan. 12, 1999 is incorporated here by reference. This German Patent Application describes the invention described hereinabove and claimed in the claims appended hereinbelow and provides the basis for a claim of priority for the instant invention under 35 U.S.C. 119.

While the invention has been illustrated and described as embodied in a system for operating an internal combustion engine, especially for a motor vehicle, it is not intended to be limited to the details shown, since various modifications and changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and is set forth in the following appended claims.

We claim:

1. A method of operating an internal combustion engine, especially in a motor vehicle, said internal combustion engine (1) comprising a combustion chamber (4) connected to an intake pipe (6) for supplying air to the combustion chamber, an exhaust feedback line (14) connected to the intake pipe (6) for exhaust gas feedback, a regulating valve (8) in the intake pipe (6) through which the air is fed to the combustion chamber (4) and an exhaust gas feedback valve (15) in the exhaust feedback line (14), said method comprising the steps of:

a) feeding air to said combustion chamber (4) through said regulating valve (8) in said intake pipe (6);

b) determining a mass flow (msdk) through the regulating valve (8);

c) feeding exhaust gas through the exhaust gas feedback line (14) into the intake pipe (6);

d) determining a mass flow (msagr) through the exhaust gas feedback valve (15); and e) dividing the mass flow (msagr) through the exhaust gas feedback valve (15) determined in step d) into an inert gas portion (msagr') and an air portion (msl) according to an air/fuel ratio (Lambda).

2. The method as defined in claim 1, wherein said air portion (msl) is added to said mass flow (msdk) through said regulating valve (8).

3. The method as defined in claim 1, further comprising first determining a normal mass flow (msagrn) through said regulating valve (8) from a duty ratio (ta_agr) of said exhaust gas feedback valve (15) and then determining said mass flow (msagr) through said regulating valve (8) according to parameters of said internal combustion engine (1).

4. A control means for a control unit (17) of an internal combustion engine, especially for a motor vehicle, said internal combustion engine (1) comprising said control unit (17), a combustion chamber (4) connected to an intake pipe (6) for supplying air to the combustion chamber, an exhaust feedback line (14) connected to the intake pipe (6) for exhaust gas feedback, a regulating valve (8) in the intake pipe (6) through which the air is fed to the combustion chamber (4) and an exhaust gas feedback valve (15) in the exhaust feedback line (14), and wherein said control means including a processing device and means for storing a program executable by means of the processing device and wherein said program comprises means for performing a method of operating said internal combustion engine, said method comprising the steps of:

a) feeding air to said combustion chamber (4) through said regulating valve (8) in said intake pipe (6);

b) determining a mass flow (msdk) through the regulating valve (8);

c) feeding exhaust gas through the exhaust gas feedback line (14) into the intake pipe (6);

d) determining a mass flow (msagr) through the exhaust gas feedback valve (15); and e) dividing the mass flow (msagr) through the exhaust gas feedback valve (15) determined in step d) into an inert gas portion (msagr') and an air portion (msl) according to an air/fuel ratio (Lambda).

5. An internal combustion engine, especially for a motor vehicle, said internal combustion engine comprising a combustion chamber (4) connected to an intake pipe (6) for supplying air to the combustion chamber, an exhaust feedback line (14) connected to the intake pipe (6) for exhaust gas feedback, a regulating valve (8) in the intake pipe (6) through which the air is fed to the combustion chamber (4) and an exhaust gas feedback valve (15) in the exhaust feedback line (14), and a control unit (17), said control unit (17) comprising means for determining a mass flow (msdk) through said regulating valve (8) and a mass flow (msagr) through said exhaust gas feedback valve (15) and means for dividing the mass flow (msagr) through said exhaust gas feedback valve (15) into an inert gas portion (msagr') and an air portion (msl) according to an air/fuel ratio (Lambda).

* * * * *